(12) United States Patent
Thomsen et al.

(10) Patent No.: US 7,660,990 B1
(45) Date of Patent: Feb. 9, 2010

(54) METHOD FOR ESTABLISHING A SECURE AD HOC WIRELESS LAN

(75) Inventors: Brant D. Thomsen, Sandy, UT (US); Brent R. Beachem, Riverton, UT (US); Thomas M. Wheeler, Bountiful, UT (US)

(73) Assignee: 3Com Corporation, Marlborough, MA (US)

( * ) Notice: Subject to any disclaimer, the term of this patent is extended or adjusted under 35 U.S.C. 154(b) by 852 days.

(21) Appl. No.: 10/832,698

(22) Filed: Apr. 27, 2004

(51) Int. Cl.
H04L 29/06 (2006.01)
(52) U.S. Cl. ........................ 713/171; 713/153
(58) Field of Classification Search ............... 713/153, 713/171
See application file for complete search history.

(56) References Cited

U.S. PATENT DOCUMENTS

| | | | |
|---|---|---|---|
| 6,571,111 B1* | 5/2003 | Mayo et al. ............. | 455/574 |
| 7,219,223 B1* | 5/2007 | Bacchus et al. ......... | 713/150 |
| 2002/0085516 A1* | 7/2002 | Bridgelall ............... | 370/329 |
| 2002/0118664 A1* | 8/2002 | Ishibashi et al. ........ | 370/338 |
| 2003/0084287 A1* | 5/2003 | Wang et al. ............. | 713/168 |
| 2003/0119484 A1* | 6/2003 | Adachi et al. ........... | 455/411 |
| 2004/0264413 A1* | 12/2004 | Kaidar et al. ........... | 370/332 |

OTHER PUBLICATIONS

Lee, Jong-Hoon; Park, Ho Jin; "A User Authentication Protocol using EAP for Mobile Ad Hoc Networks", Published in Communication, Network, and Information Security, Dec. 2003.*
Geier, J., "*802.1X Offers Authentication and Key Management*," website: www.wi-fiplanet.com.
Phifer, L., "*802.1X Port Access Control for WLANs*," website: www.wi-fiplanet.com.
Blunk, L., Vollbrecht, J., "*PPP Extensible Authentication Protocol (EAP)*," The Internet Society, Mar. 1998.
Flow chart, website: www.wi-fiplanet.com.

* cited by examiner

*Primary Examiner*—Kimyen Vu
*Assistant Examiner*—Yogesh Paliwal

(57) ABSTRACT

Secure communications on a network. An unauthenticated client on an network sends start packets to locate other clients. The unauthenticated client receives responses to the start packets from other clients on the network. The responses may be advertise packets that are from advertising clients that may be authenticated clients or other unauthenticated clients in authenticated mode. The unauthenticated client prioritizes the received packets so that authentication can be performed with the most desirable advertising client. Authentication packets are sent and received between the unauthenticated client and the advertising client in an attempt to authenticate.

17 Claims, 7 Drawing Sheets

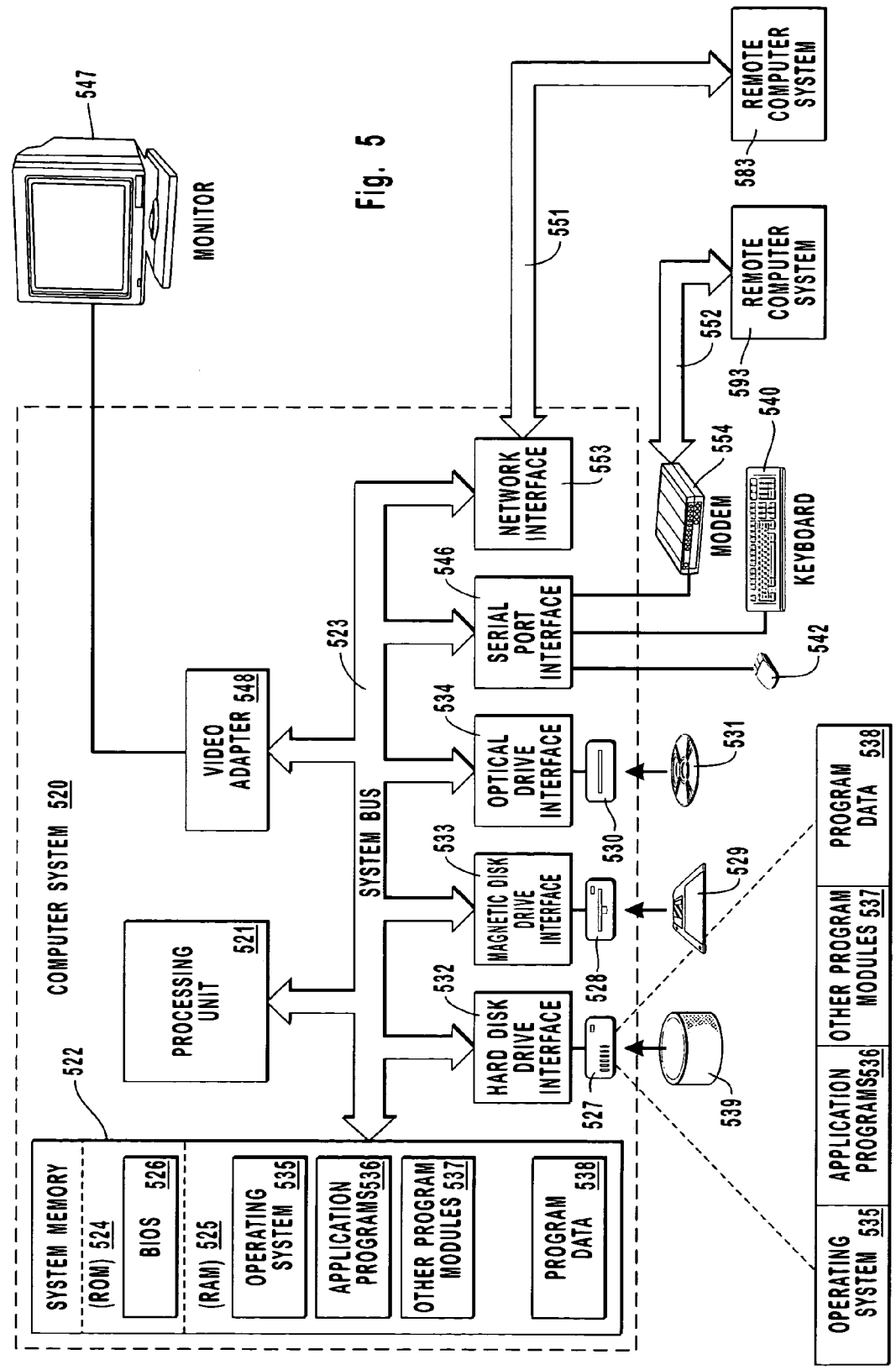

METHOD FOR ESTABLISHING A SECURE AD HOC WIRELESS LAN

BACKGROUND OF THE INVENTION

1. The Field of the Invention

The invention generally relates to establishing secure communications in a wireless network. More specifically, the invention relates to authenticating clients in a wireless network.

2. Description of the Related Art

Much of the functionality of modern day computers can be realized by implementing the computers in networks. Networks interconnect computers and allow data to be quickly and efficiently shared between the computers.

Businesses and corporations that implement computer networks often implement hard wired Ethernet networks as part of the construction of new buildings or during the build-out of rented business space. Home users that desire to implement networks are faced with expensive retrofitting if they wish to implement a hard wired Ethernet network. One way to avoid retrofitting a wired network is to use a wireless network. Wireless networks send and receive signals using radio frequencies. Wireless networks are also widely used in business settings for users with laptops, PDAs and other portable devices. Wireless networks allow users to remain connected to a network while roaming in different areas of the business.

One challenge that arises with the use of wireless networks is maintaining the security and integrity of data. For example, data that is transmitted through the air waves may be intercepted by unauthorized users using equipment that "sniffs" for wireless communications. In this way, data transmitted over the air waves can be obtained by individuals other than those to whom the data was intended to be transmitted. At a minimum such eavesdropping invades privacy and in worse scenarios, can result in the loss of sensitive information such as credit card numbers, passwords, confidential data and the like.

A further problem arises when an unauthorized user obtains sufficient information to add a computer as part of the network. Such a user may be able to access, delete and modify data on other computers in the network. In extreme cases, the unauthorized user may be able to commandeer other computers on the network for sending spam or launching attacks on other computers.

To combat the interception of data on wireless networks, various security schemes have been implemented. One of these schemes relies on data encryption. Data encryption scrambles the data that is sent across the network. Both the sender and receiver of data have an encryption key that is used to determine how the data is scrambled and descrambled. One common data encryption scheme used in wireless networks is Wired Equivalent Privacy (WEP). WEP allows users to select a common key. This key may be transmitted to users via word of mouth, as a written communication, by email, and other such methods. All users on the network should use the same WEP key.

One problem that arises with the use of WEP keys is the ease with which WEP can be cracked. Using common sniffing tools, a rouge user can monitor the network traffic. When a sufficient amount of network traffic has been monitored, the WEP key can be deduced. One way to combat this sort of eavesdropping is to periodically change the WEP key. The interval between changing the WEP key is preferably some interval less than the amount of time it takes to crack a WEP key. One challenge is that some sniffing tools have the ability to crack a WEP key within hours or minutes. Thus, using only WEP, manual changes need to be made to each client on a network in very short intervals. The difficulty and time consuming nature of such a task means that networks implementing WEP typically do not change the WEP key, leaving the network vulnerable to eavesdroppers.

Networks can be divided into client/server networks and peer to peer networks. Clients on wireless client/server networks are often referred to as operating in infrastructure mode. Wireless client/server networks have a central access point that acts as a central hub for clients on the wireless client/server network. Clients on wireless peer to peer networks are often referred to as operating in Ad Hoc mode. Ad Hoc clients communicate directly with each other.

Client/server networks can implement a protocol that allows for dynamically re-keying encryption keys. This protocol is known as the Extensible Authentication Protocol (EAP). Using EAP, a server can authenticate a client using passwords and various other authentication techniques. Once the client has been authenticated, the server can transmit, and direct the client to use, a new encryption key.

Ad Hoc networks and infrastructure networks with multiple access points do not allow for this dynamic authentication and re-keying. Users of Ad Hoc networks and infrastructure networks with multiple access points are therefore relegated to using less secure communication methods.

SUMMARY OF THE INVENTION

One embodiment of the invention includes a method for configuring an unauthenticated client in a network for secure communications. In this context, a client may be a client in an Ad Hoc network an access point in an infrastructure network with multiple access points, or another device on a network. The method includes periodically broadcasting a start packet. The unauthenticated client then waits for responses to the start packet. These responses may be in the form of advertise packets. Any responses that are received from advertising clients are prioritized such that the unauthenticated client can authenticate with the most desirable advertising client. The unauthenticated client then attempts to authenticate with an advertising client corresponding to the highest priority response. If the unauthenticated client successfully authenticates with the advertising client with the highest priority response, the previously unauthenticated client is configured for secure communications by using information from the response and from information obtained in the attempt to authenticate.

In another embodiment of the invention, an authenticating client is authenticated to an authenticated client in a network. The authenticated client, periodically and in response to receiving a start packet, broadcasts an advertise packet with information regarding encryption available on the authenticated client. The authenticated client receives a packet from an authenticating client. If the packet is from an unauthenticated client, the authenticated client attempts to authenticate the authenticating client. If the authenticating client attempts authentication using the same encryption type as the authenticated client, the authenticated client sends the appropriate authentication packets. If the authenticating client attempts authentication using a larger encryption type than the authenticated client, the authenticated client sends a cancel packet. If the authenticating client attempts authentication using a lower encryption type than the authenticated client, the authenticated client sends authentication packets to authenticate at the lower encryption type. If authentication is successful at the lower encryption type, the authenticated client is configured for secure communications using the lower encryption type.

Advantageously, a secure wireless network can be established at an Ad Hoc network, an infrastructure network with multiple access points, or in other networks. The wireless network can use an extension of EAP to facilitate changing encryption keys such that time consuming manual configurations can be avoided. Additionally, embodiments of the invention can be used with existing wireless LAN devices that support EAP. Thus no modifications are needed to the wireless LAN devices or their drivers. These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 illustrates a typical environment where aspects of the present invention may be practiced.

DETAILED DESCRIPTION OF EXEMPLARY EMBODIMENTS

Embodiments of the present invention implement secure network communications using encryption in wireless networks. While the embodiments below are illustrated in one example using clients on an Ad Hoc wireless network, other embodiments contemplate being used in other topologies. For example, a client may be a wireless access point in an infrastructure network with multiple wireless access points. Other embodiments are also contemplated.

Clients on an Ad Hoc wireless network send and receive Ad Hoc advertise packets. The Ad Hoc advertise packets include information about encryption types available on clients sending the Ad Hoc advertise packets. Clients on the Ad Hoc wireless network can establish secure Ad Hoc communications using authentication types supported by other clients in the Ad Hoc wireless network.

Figure 1:
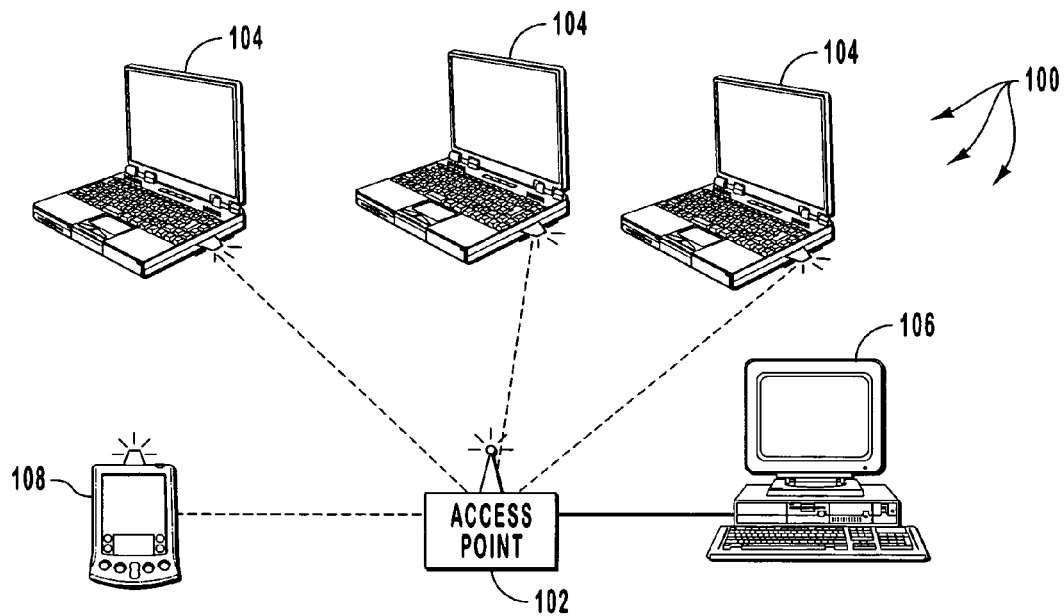
FIG. 1 illustrates a server/client wireless and wired network with clients in infrastructure mode.

FIG. 1 illustrates a client/server network 100 with wireless clients operating in infrastructure mode. In infrastructure mode, wireless clients connect to an access point 102. The access point 102 acts as a hub for directing communications between the wireless clients. In the particular application shown in FIG. 1, wireless clients may include wireless laptop clients 104, hard wired desktop clients 106 or wireless PDA clients 108. Although not enumerated here, other types of clients may also be used. In infrastructure mode, the wireless clients may communicate with the access point 102 using the extensible authentication protocol over LAN (EAPOL).

Figure 2:
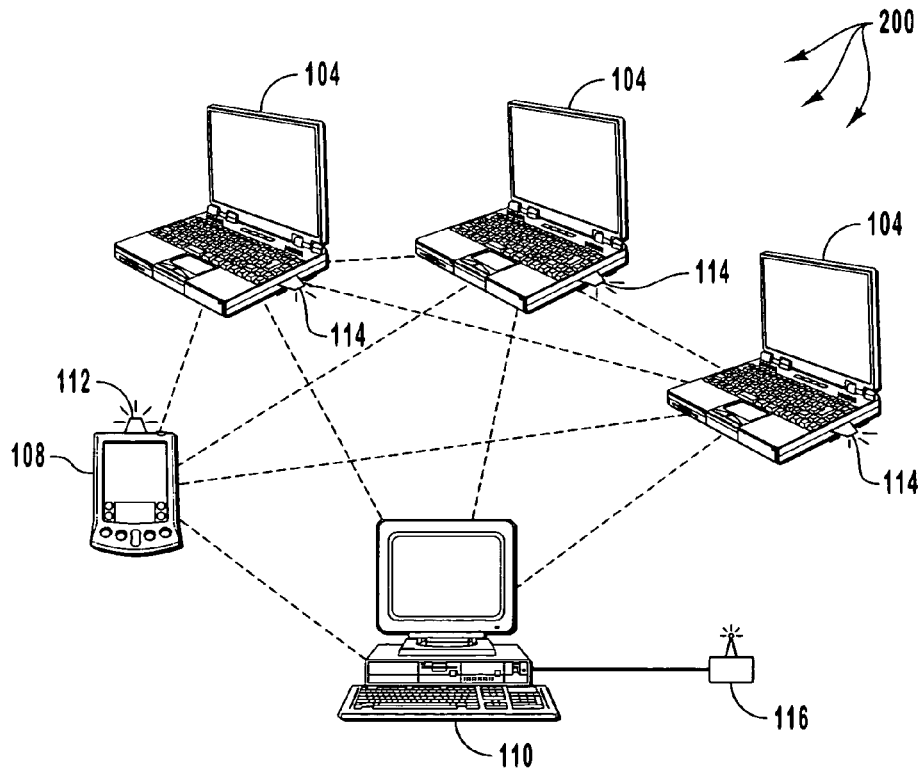
FIG. 2 illustrates an Ad Hoc wireless network.

FIG. 2 illustrates an Ad Hoc wireless network 200 with wireless clients operating in Ad hoc mode. In Ad Hoc mode, each of the wireless clients connects to the other wireless clients in a peer to peer fashion. The Ad Hoc wireless network 200 may also include wireless PDA clients 108, wireless laptop clients 104 and desktop clients 110. In one exemplary embodiment of the invention the clients include wireless LAN devices that may be for example PCMCIA cards, compact flash cards, smart media cards, integrated wireless, USB connected wireless adapters and the like. The wireless PDA client 108 shown in FIG. 2 includes a compact flash wireless card 112. The wireless laptop clients 104 include PCMCIA wireless cards 114. The desktop client 110 includes a USB connected wireless adapter 116. The wireless LAN devices may be designed to operate using a number of different communication protocols including but not limited to 802.11a, 802.11b, 802.11g, Bluetooth and the like. The wireless LAN devices or the drivers used with the wireless LAN devices may include computer executable instructions for implementing secure Ad Hoc communications such as by using WEP.

In one embodiment, Ad Hoc EAPOL is used to support secure Ad Hoc communications. Ad Hoc EAPOL authentication is an extension to standard EAPOL authentication that is used in client/server networks. In this way, clients that already support EAPOL authentication can be extended to support Ad Hoc EAPOL authentication. There is therefore no need to update wireless LAN devices or their drivers. Ad Hoc EAPOL uses a unique EAPOL type to send packets that include both Ad Hoc information and standard EAP packets. To facilitate Ad Hoc EAPOL three additional packets may be used and will be further described herein. These packets include an Ad Hoc advertise packet, an Ad Hoc select encryption packet, and an Ad Hoc cancel packet. Using Ad Hoc EAPOL authentication, authenticated clients authenticate unauthenticated clients. Alternatively, such as when there are no authenticated clients, unauthenticated clients switch to an authenticated mode in response to packets received by other unauthenticated clients. This process is described in more detail further herein. Two way EAP authentication may be used in some embodiments of the invention. Thus, a first client authenticating to a second client is equivalent to the second client authenticating to the first client.

Acts for Unauthenticated Clients

Figure 3A:
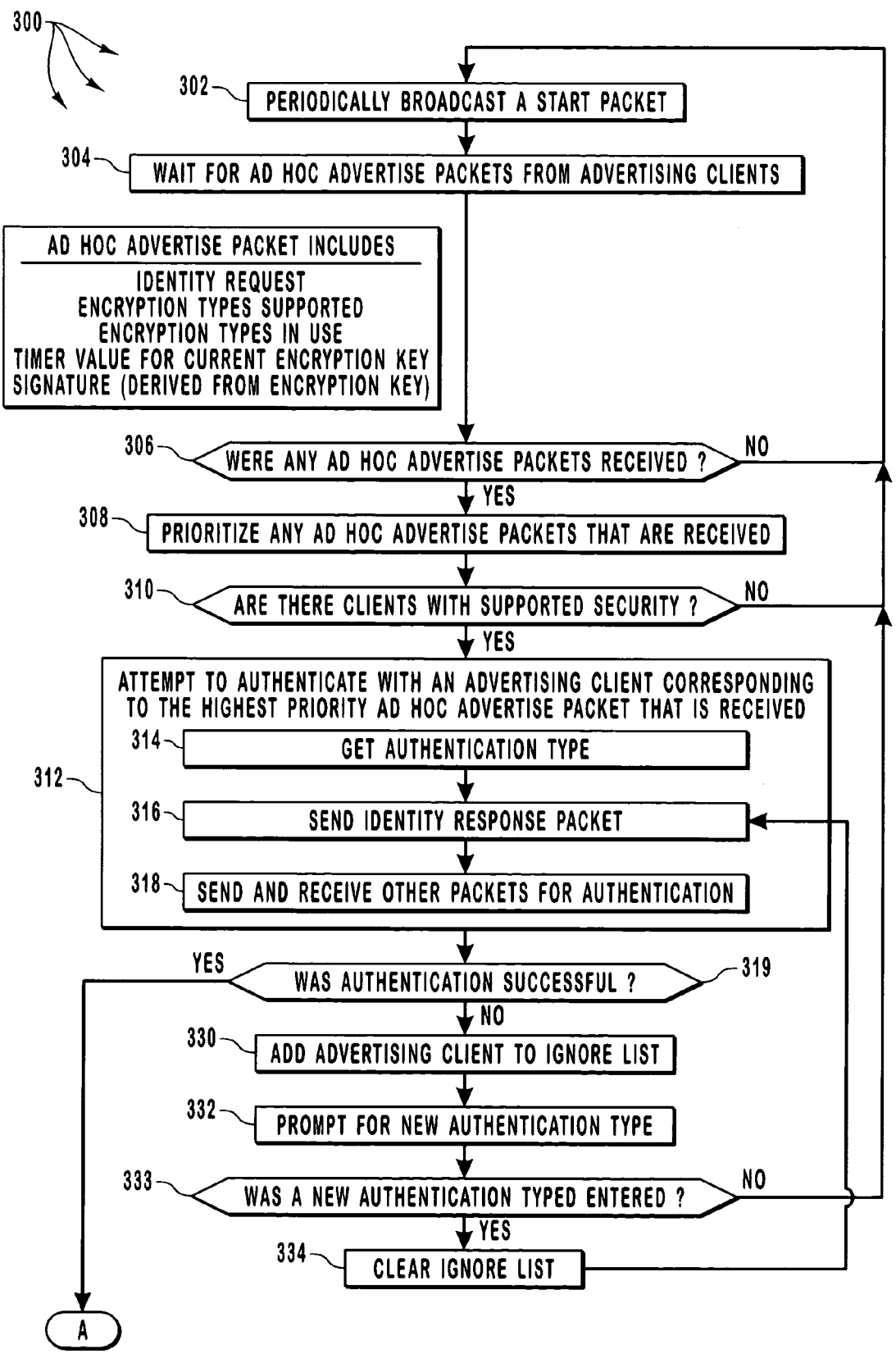
FIGS. 3A and 3B illustrate a flow chart including acts for authenticating an unauthenticated client in an Ad Hoc wireless network.
Figure 3B:
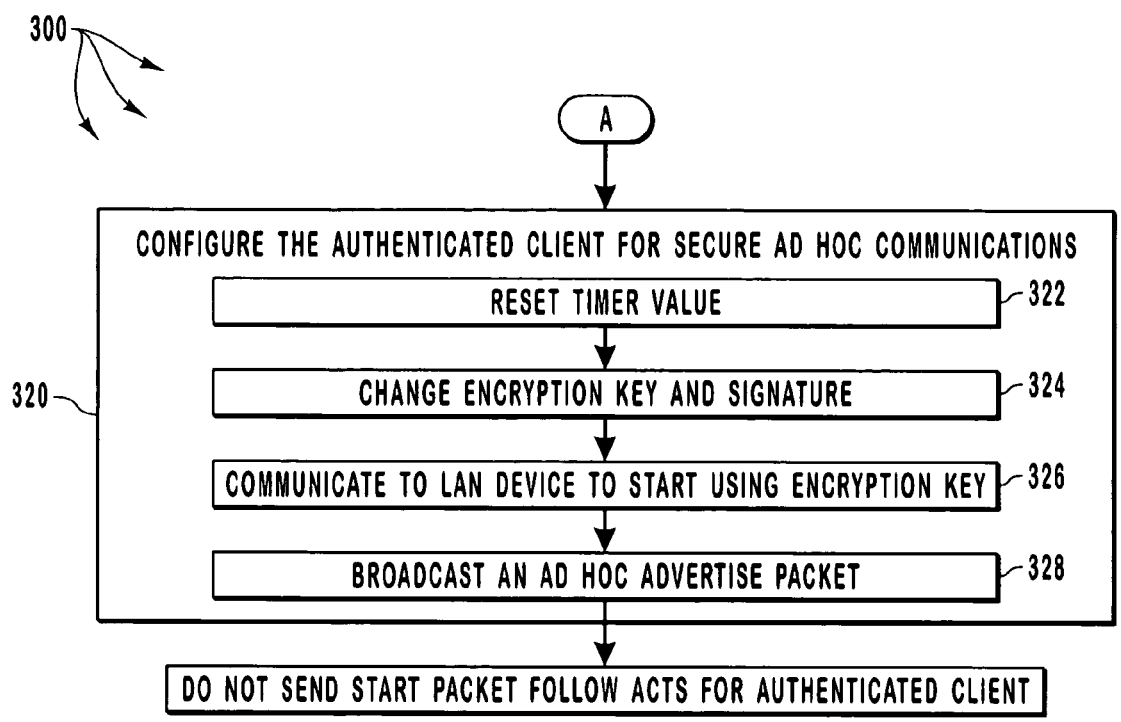

FIGS. 3A and 3B illustrate a flow chart that includes act performed, in one embodiment, by an unauthenticated client. These acts help to authenticate the client for use in an Ad Hoc wireless network. The method 300 includes the unauthenticated client periodically broadcasting a start packet (302). The start packet may be for example an EAPOL start packet. The method 300 may include broadcasting the start packet (302) for so long as the unauthenticated client remains unauthenticated. The period for periodically broadcasting a start packet may be correlated to the power saving mode of a LAN device at the unauthenticated client. To conserve power, wireless LAN devices may operate in a power saving mode. When not communicating with clients in a network, the wireless LAN device periodically switches on and off. During the "on" periods, the wireless LAN device checks for incoming communication packets and sends any communication packets that need to be periodically sent. Thus, the period for periodically broadcasting a start packet may be correlated, in one embodiment, to the "on" period of the power saving mode of the LAN device. Periods for periodically broadcasting a start packet do not need to necessarily be of equal durations.

The unauthenticated client waits for Ad Hoc advertise packets from advertising clients (304). The Ad Hoc advertising packets may be sent from clients that are either authenticated or unauthenticated but operating in authenticated mode. The Ad Hoc advertising clients, in one embodiment, broadcast the Ad Hoc advertising packets as a way of communicating encryption types available to the client sending the Ad Hoc advertising packets and the encryption types in use by the client sending the Ad Hoc advertising packets. When an Ad Hoc advertising packet is received from an authenticated client, the Ad Hoc advertising packet may generally include an identity request, an encryption types supported by the advertising client argument, an encryption type currently being used by the advertising client argument, a timer value argument specifying the length of time an encryption key currently in use has been in use, and a signature argument derived from the encryption key currently in use. When an unauthenticated client in authenticated mode sends an Ad Hoc advertise packet, the encryption type currently being used, timer value and signature arguments are optional and the Ad Hoc advertising packets will not likely include those arguments. This is because any values in these arguments will be arbitrary values because an unauthenticated client is typically not using encryption with values that can be applied to these arguments. In one embodiment, the unauthenticated client can determine that an Ad Hoc advertise packet has been received from an authenticated client if the Ad hoc advertise packet includes a least one of encryption types used by the advertising clients sending the Ad Hoc advertise packet, the timer value for an encryption key currently being used by the advertising clients sending the Ad Hoc advertise packet, and the signature derived from the encryption key.

The unauthenticated client checks to see if any Ad Hoc advertise packets have been received (306). If no Ad Hoc advertise packets have been received, the unauthenticated client continues to periodically broadcast start packets (302) and wait for Ad Hoc advertise packets from advertising clients (304).

If Ad Hoc advertise packets have been received, the unauthenticated client prioritizes any Ad Hoc packets that are received (308). The packets are prioritized according to the type of client from which they are received. The packets, in one embodiment, are prioritized according to the following criteria which is organized according to highest priority:

1. Clients that are using encryption with an encryption algorithm supported by the unauthenticated client. These clients are currently authenticated.

1.1 Clients that are using encryption with an encryption algorithm supported by the unauthenticated client are prioritized by the encryption type they are using. Clients with smaller encryption types are ranked higher than clients with larger encryption types. Smaller encryption types are ranked higher to allow for encryption downgrades on the secure Ad Hoc network. Encryption downgrades are discussed in more detail below.

1.2 Clients that are using encryption with an encryption algorithm supported by the unauthenticated client are further sorted by timer value. Clients with timer values that indicate that an encryption key has been used for a lesser period of time are prioritized higher than clients with timer values that indicate than an encryption key has been used for a greater period of time. Thus, newer encryption keys are preferred over older encryption keys.

2. Clients that are not using encryption and support one or more encryption algorithms supported by the unauthenticated client. These clients are not currently authenticated.

2.1 Clients that are not using encryption and support one or more encryption algorithms supported by the unauthenticated client are further prioritized by the encryption types they have in common with the unauthenticated client. Clients with larger encryption types rank higher than clients with smaller encryption types.

3. Clients that are using encryption and are using an encryption algorithm not supported by the unauthenticated client that also support one or more encryption algorithms supported by the unauthenticated client. These clients are currently authenticated.

3.1 Clients that are using encryption and using an encryption algorithm not supported by the unauthenticated client but that also support one or more encryption algorithms supported by the unauthenticated client are further prioritized by the encryption types that they have in common with the unauthenticated client. Clients with larger encryption types rank higher than clients with smaller encryption types. Encryption types larger than one the other client is currently using should be ignored.

3.2 Clients that are using encryption and using an encryption algorithm not supported by the unauthenticated client that also support one or more encryption algorithm supported by the unauthenticated client are further prioritized by timer value where timer values that are smaller are prioritized higher.

4. Clients that do not support any of the encryption algorithms supported by the unauthenticated client. These clients should be ignored.

After the Ad Hoc advertise packets have been prioritized (308), the unauthenticated client checks to see if any Ad Hoc advertise packets have been received from advertising clients with security supported by the unauthenticated client (310). If no Ad Hoc advertise packets have been received from advertising clients with security supported by the unauthenticated client, the unauthenticated client continues to periodically broadcast start packets (302) and wait for Ad Hoc advertise packets from advertising clients (304). If Ad Hoc advertise packets have been received from advertising clients with security supported by the unauthenticated client, the unauthenticated client attempts to authenticate with an advertising client corresponding to the highest priority Ad Hoc advertise packet that has been received (312).

Attempting to authenticate (312) in one embodiment includes getting an authentication type (314), sending an identity response packet to an advertising client (316), and sending and receiving other packets for authentication to and from the advertising client (318). Authentication types may include items such as but not limited to passwords and optionally usernames, digital certificates, digital certificates stored on smart cards, public keys, one time passwords, biometric authentication such as fingerprints or iris scans and the like. The authentication type should be able to be validated by any client to which it is sent that is interested in the session. By being able to validate the authentication type, a secure Unicast key, a key used by two clients to conduct secure communications between just the two clients, can be established. The encryption key, a broadcast key for use by all clients on the network, can thus be sent securely to the unauthenticated client. An identity response packet may include the identity of the unauthenticated client and the authentication type. The identity response packet may be an Ad Hoc select encryption packet that includes a unique Ad Hoc code identifying the packet as a select encryption packet. Other packets sent in the authentication process may be standard packets, such as for example, EAPOL type 0 packets.

The authentication algorithm should generate a session encryption key for the Unicast as part of the attempt to authenticate. This session encryption key can be used for example to create a packet signature and to encrypt the encryption key (a broadcast key). Using a session encryption key helps to keep the authentication packets secure until secure Ad Hoc communications can be established.

If attempting to authenticate (312) results in the unauthenticated client becoming an authenticated client, the authenticated client is configured for secure Ad Hoc communications (320). Configuring the authenticated client for secure Ad Hoc communications (320 FIG. 3B) may include resetting a timer value (322), changing an encryption key (324) to one specified in a broadcast key (a Unicast may be sent as well, but will be ignored), communicating to a LAN device at the now authenticated client to start using the encryption key (326) and broadcasting an Ad Hoc advertise packet (328).

Clients configured for secure Ad Hoc communications may include a timer value that indicates the length of time that an encryption key has been in use. When a new encryption key is used, the timer values should be reset so that the length of time that the new encryption key has been in use can be measured. When a client becomes authenticated, the client should begin using an encryption key or change to a new encryption key. The encryption key should match other encryption keys in use on the Ad Hoc network. What encryption key to use in specified by an advertising client in a broadcast key as described above. When a new encryption key is used, a LAN device at the client using a new encryption key is instructed to start using the new encryption key. As described above, this LAN device may be a PCMCIA card, compact flash card, integrated wireless, and the like. Broadcasting an Ad Hoc advertise packet allows a client to communicate to other clients the types of security available for use, the type of security currently in use, the length of time an encryption key in use has been used, an invitation to begin communicating using the secure Ad Hoc communications, a signature for determining the nature of the encryption key, and the like. Once a client has become authenticated and is configured for secure Ad Hoc communications, the device should not send any more start packets (except for in special cases such as re-keying as described in more detail below) and should follow acts for an authenticated client as will be discussed in the discussion of FIGS. 4A, 4B, and 4C.

The encryption type that will be used by the now authenticated client depends on the prioritization group to which the advertising client belongs. For example, if the adverting client belongs to group 1 above (authenticated clients using an encryption algorithm supported by the unauthenticated client), the encryption type currently being used by the advertising client will be used. If the advertising client belongs to group 2 (unauthenticated clients that support one or more encryption algorithms supported by the unauthenticated client), the largest encryption type supported by the now authenticated client and the advertising client will be used. If the advertising client belongs to group 3 (authenticated clients that are using an encryption algorithm not supported by the unauthenticated client but that also support one or more encryption algorithms supported by the unauthenticated client), the largest encryption type supported by both the now authenticated client and the advertising client that is smaller than the encryption type currently used by the advertising client will be used.

If attempting to authenticate does not result in the unauthenticated client becoming authenticated, various other acts are performed. For example, the advertising clients to which the authentication was attempted will be added to an ignore list (330 FIG. 3A). The ignore list includes an enumeration of advertising clients whose Ad Hoc advertising packets are disregarded by the unauthenticated client. In one embodiment, MAC addresses (permanent identification labels assigned to LAN devices by the LAN device manufacturer and transmittable on a network by the LAN devices) are maintained in the ignore list. The method 300 may also include prompting a user at the unauthenticated client for a new authentication type (332). This may be necessary when a user has inadvertently input an incorrect authentication type, or for other reasons. In some embodiments of the invention, prompting a user at the unauthenticated client for new authentication type (322) is performed after unsuccessfully attempting to authenticate with other advertising clients. If a new authentication type is entered, the ignore list is cleared (334) and an attempt to authenticate with the authenticated client corresponding to the highest priority Ad Hoc advertise packet using the new authentication type (312) is made. If a new authentication type is not entered, the unauthenticated client continues to broadcast a start packet (302) and wait for Ad Hoc advertise packets from advertising clients (304). Alternatively, the unauthenticated client may attempt to authenticate with clients in the ignore list if no other clients are available for authentication.

Unauthenticated Client in Authenticated Mode

When a new Ad Hoc network is established there will be no authenticated clients on the Ad Hoc network. Therefore, one or all of the unauthenticated clients interested in a session should be able to switch themselves into authenticated mode even though the client is unauthenticated. A client switches itself into authenticated mode when it receives an authentication request such as an Ad Hoc start packet from another client. When a client has switched itself into authenticated mode, it should follow the acts for an authenticated client (as described below in the description of FIG. 4) to attempt to authenticate the client sending the Ad Hoc start packet. An unauthenticated client in authenticated mode will accept any supported encryption types. If the unauthenticated client in authenticated mode fails to authenticate to a client sending the Ad Hoc start packet, the unauthenticated client in authenticated mode should revert back to its unauthenticated state. Further, the encryption state should not be changed.

If the attempt to authenticate an unauthenticated client that sent an Ad Hoc start packet succeeds, the unauthenticated client in authenticated mode configures itself for secure Ad Hoc communication. This includes creating a random encryption key, random encryption key index, and an encryption signature appropriate for the encryption type. The unauthenticated client in authenticated mode further communicates to a LAN device at the unauthenticated client in authenticated mode to start using the encryption key. The unauthenticated client in authentication mode further sends the other authenticated client the random encryption key and a Unicast key. The unauthenticated client in authenticated mode resets a timer value where the timer value specifies the length of time a particular encryption key has been in use. Finally, the unauthenticated client in authenticated mode broadcasts and an Ad Hoc advertise packet. This will communicate to any other Ad Hoc clients what encryption types are supported, what encryption key is being used, the length of time an encryption key has been used, etc. Other clients may need to update their encryption types and keys based on the information in the Ad Hoc advertise packet. At this point, the authenticated client in authenticated mode is now a fully authenticated client and follows the acts described below for authenticated clients.

Figure 4A:
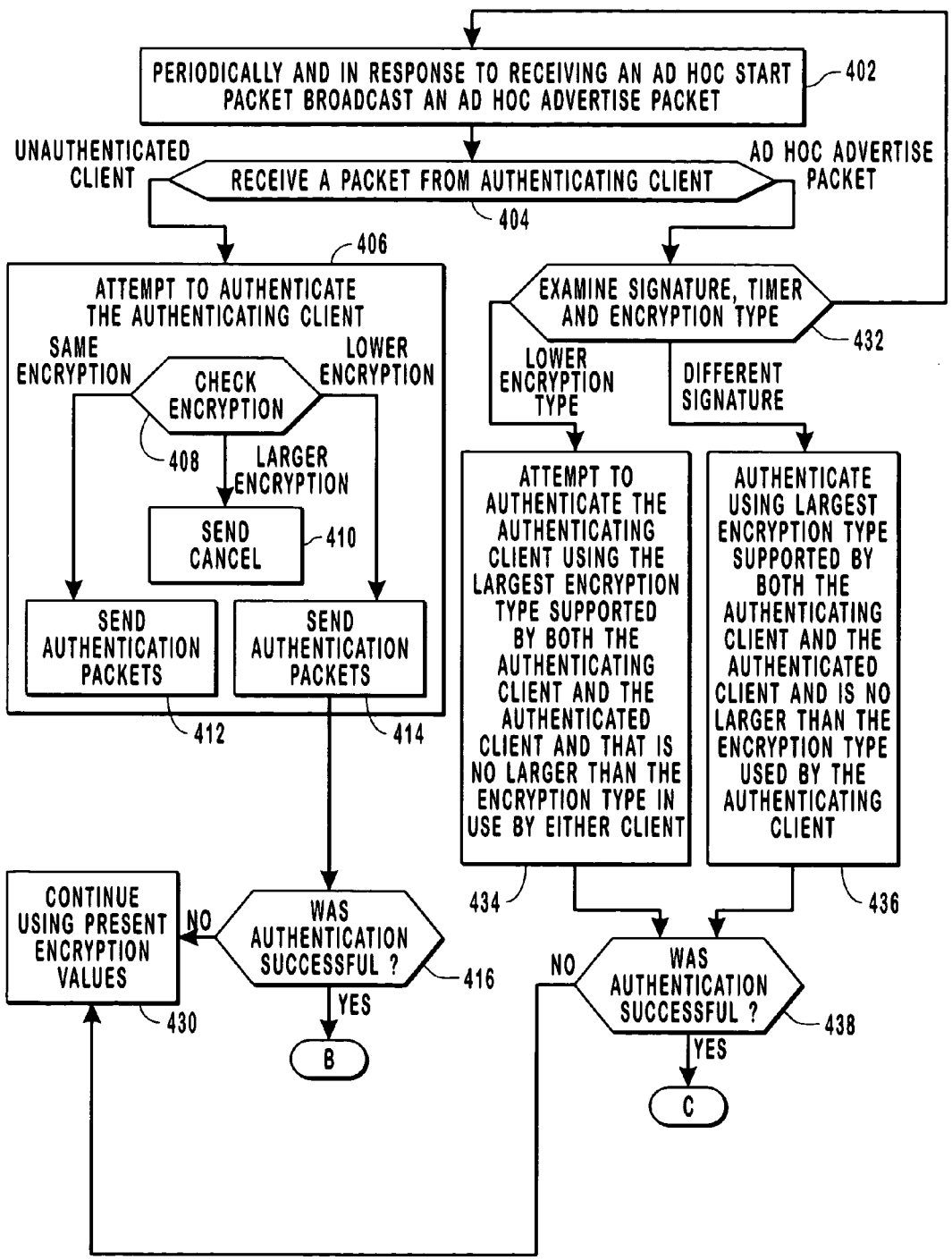
FIGS. 4A and 4B illustrate a flow chart including acts for authenticated clients and unauthenticated clients in authenticated mode in an Ad Hoc wireless network.
Figure 4B:
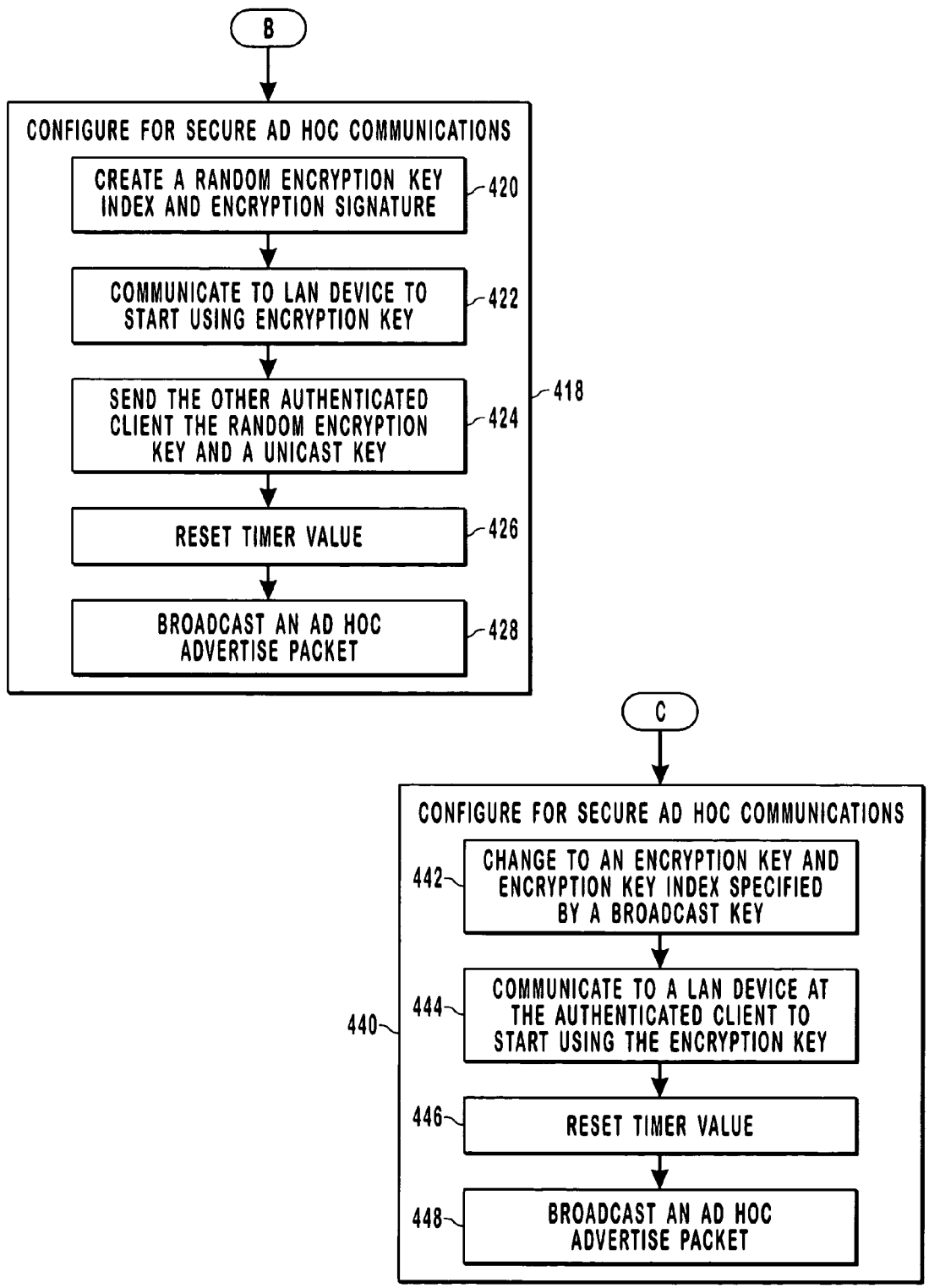
Figure 4C:
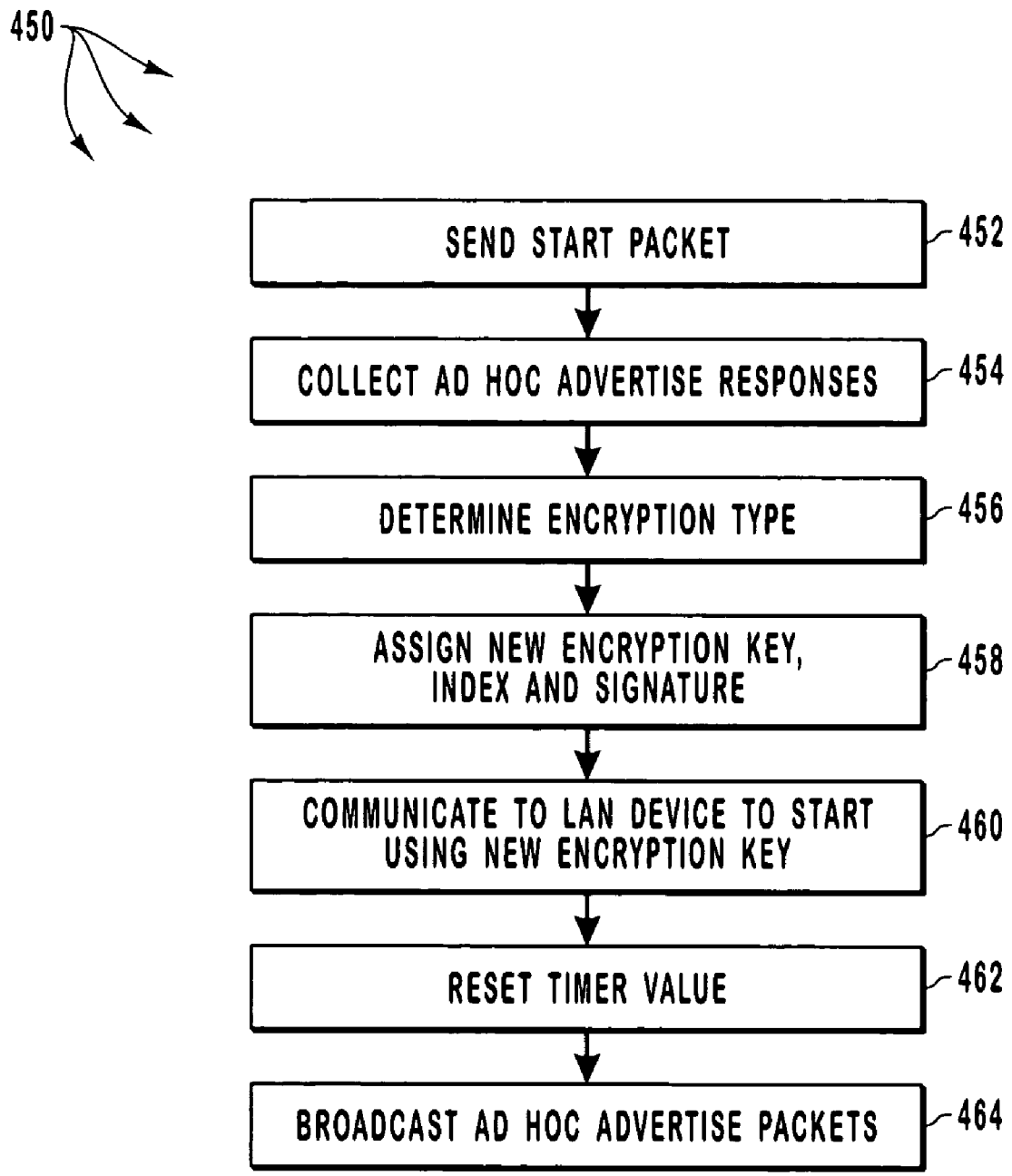
FIG. 4C illustrates a flow chart including acts for re-keying clients in an Ad Hoc wireless network.

Acts for Authenticated Clients and Unauthenticated Clients in Authenticated Mode Referring now to FIGS. 4A, 4B and 4C, acts for an authenticated client or an unauthenticated client in authenticated mode are shown and designated generally at 400. While the following description refers to authenticated clients, the description may equally apply in some circumstances to unauthenticated clients in authenticated mode. The acts shown in FIG. 4A, 4B and 4C illustrate acts that the authenticated client may perform to authenticate other clients in an Ad Hoc network. The authenticated client periodically and/or in response to receiving an Ad Hoc start packet, broadcasts an Ad Hoc advertise packet (402). The Ad Hoc advertise packets may be sent using a period that corresponds to the "on" period of a power saving mode. Periodically as used herein does not require that the periods be of equal times. The Ad Hoc advertise packet, as described above, may include an identity request, an encryption types supported by the advertising client argument, an encryption type currently being used by the advertising client argument, a timer value argument specifying the length of time an encryption key currently in use has been in use, and a signature argument derived from the encryption key currently in use. When the Ad Hoc advertise packet is sent by an unauthenticated client in authenticated mode, the Ad Hoc advertise package does not need to include an encryption type used by the client argument, timer value argument, and a signature argument. An identifier value used in the identity request contents of the advertise packets is matter of preference. In one embodiment however, the same value is always used so that any select encryption packets, which use the identifier value in the identity response contents and initiate the authentication process, can be tested to verify that they have this same value.

Packets From Unauthenticated Clients

The authenticated client then receives a packet from an authenticating client (404). If the authenticating client is an unauthenticated client, the authenticated client attempts to authenticate the authenticating client (406). Attempting to authenticate the authenticating client includes checking to see if the authenticating client supports the same encryption type as the authenticated client, only larger encryption types than the authenticated client, or smaller encryption types than the authenticated client (408).

If the authenticating client supports only larger encryption types than the authenticated client, then the authenticated client sends an Ad Hoc cancel packet (410). The authenticated client is not able to conduct secure Ad Hoc communications with the authenticating client supporting only larger encryption type. An Ad Hoc cancel packet indicates that the session is immediately cancelled. No response is expected to the Ad Hoc cancel packet.

If the encryption types supported by the authenticating client are the same as the encryption type of the authenticated client, then authentication packets are sent back and forth between the authenticated client and the authenticating client in an attempt to authenticate the authenticating client (412). Whether or not authentication is successful, there are no changes made to the authenticated client.

The authenticated client should allow for supported encryption downgrades. For example, if the encryption types supported by the authenticating client are smaller than the encryption type of the authenticated client, the authenticated client will attempt to authenticate the authenticating client using the largest encryption type supported by both the authenticated client and the authenticating client (414). The authenticated client then checks to see if authentication was successful (416) meaning that the authenticating client becomes an authenticated client. If authentication is successful, the authenticated client configures itself for secure Ad Hoc communications (418 FIG. 4B). Configuring for secure Ad Hoc communications (418) includes creating a random encryption key, key index and encryption signature appropriate for the encryption type (420), communicating to a LAN device at the authenticated client to start using the created random encryption key (422), sending the other authenticated client the random encryption key and a Unicast key (424), resetting a timer value (426) were the timer value specifies the length of time a particular encryption key has been in use, and broadcasting an Ad Hoc advertise packet (428) to alert other clients to the type of encryption being used. If authentication is not successful the authenticated client continues using the present encryption values (430 FIG. 4A) (i.e. those values in use prior to attempting to authenticate).

Returning now to act 404 in FIG. 4A, if the packet received from the authenticating client is an Ad Hoc advertise packet, where the Ad Hoc advertise packet includes an identity request, encryption types supported by the authenticating client, encryption type used by the authenticating client, a timer value indicating the length of time an encryption key has been used by the authenticating client, and a signature derived from the authentication key, the authenticated client examines at least one of the signature, timer value and encryption type used by the authenticating client (432).

Encryption Downgrades

The method 400 allows for downgrades of the encryption type of the Ad Hoc network to a lower encryption type. If the encryption type used by the authenticating client is a lower encryption type then the encryption type used by the authenticated client, the Ad Hoc network is moving to a lower encryption type. In this case, the authenticated client attempts to authenticate to the authenticating client using the largest encryption type supported by both the authenticating client and the authenticated client (434). The authenticated client should attempt to authenticate the authenticating client using the largest encryption type supported by both the authenticated and authenticating clients that is no larger than the encryption type in use by either client. If attempting to authenticate the authenticating client using the largest encryption type supported by both the authenticating client and the authenticated client (434) succeeds, the authenticated client is then configured for secure Ad Hoc communications (440 FIG. 4B). Configuring the authenticated client for secure Ad Hoc communications (440) includes changing an encryption key and signature to use the encryption key specified by a broadcast key (442) (the Unicast key may also be sent, but can be ignored), communicating to the LAN devices at the authenticated client to start using the encryption key (444), resetting a timer value (446) where the timer value specifies the length of time a particular encryption key has been in use and broadcasting an Ad Hoc advertise packet (448). If attempting to authenticate using the largest encryption type supported by both the authenticating client and the authenticated client (434 FIG. 4A) is not successful the authenticated client continues using the present encryption values (430).

Multiple Encryption Keys

The method 400 further allows for the recognition that multiple encryption keys are being used by clients interested in a session. Multiple encryption keys may occur when two Ad Hoc networks begin to overlap. Alternatively, multiple encryption keys may occur when an Ad Hoc client determines that re-keying is necessary. Re-keying will be discussed in more detail below following the discussion of the recognition of multiple encryption keys. Returning now to act 432 in FIG. 4A, if the Ad Hoc advertise packet has a different signature than a signature being used by the authenticated client and the Ad Hoc advertise packet has a smaller timer value than a timer value being used by the authenticated client, multiple keys are being used by clients interested in a session. In this case, the authenticated client attempts to authenticate to the authenticating client using the largest encryption type supported by both the authenticated client and the authenticating client that is no larger than the encryption type used by the authenticating client prior to attempting to authenticate to the authenticating client (436). If attempting to authenticate to the authenticating client using the largest encryption type supported by both the authenticating client and the authenticated client that is no larger than the encryption type used by the authenticating client prior to attempting to authenticate to the authenticating client (436) succeeds the authenticating client is configured for secure Ad Hoc communications (440 in FIG. 4B). Using this method, a client with the newer encryption key, i.e. a client with a timer value indicating that an encryption key has been used for a lesser period of time, will eventually have its encryption key used by the clients in the secure Ad Hoc network.

Re-keying

In certain situations an authenticated client may determine that re-keying (450 FIG. 4C) is necessary. For example, if a certain amount of time has past as indicated by the timer value, or if a certain amount of data has been sent and received such that the current encryption key may be cracked by an eavesdropper using sniffing tools, the authenticated client will determine that re-keying is necessary. The authenticated client determines the most appropriate encryption type to use. If the authenticated client is already using the largest encryption type it supports, then the authenticated client will continue to use that encryption type during the re-keying process. Otherwise, the authenticated client initiates re-keying by sending a start packet (452). The authenticated client will then collect any Ad Hoc advertise responses (454) in the form of Ad Hoc advertise packets. The authenticated client will then determine the largest encryption type that may be used for secure Ad Hoc communications (456). This is done by determining the largest encryption type that is supported by the authenticated client and all the clients that send Ad Hoc advertise packets. If the largest encryption type supported by any of the clients that send Ad Hoc advertise packets is smaller than the encryption type currently being used by the authenticated client, the authenticated client should continue using its current encryption type.

The authenticated client then assigns itself a new encryption key, encryption index and signature (458). The authenticated client will communicate to a LAN device at the authenticated client to start using the new encryption key (460). The authenticated client will reset the timer value (462). The authenticated client will then broadcast an Ad Hoc advertise packet (464). In one embodiment, the authenticated client will frequently broadcast Ad Hoc advertise packets (464) for a period of time. Other clients, on seeing the Ad Hoc advertise packets, will authenticate to the authenticated client or any other client with the same signature as the authenticated client. Eventually, the new encryption keys should percolate throughout the Ad Hoc network. The authenticated client also has the option of broadcasting start packets to determine if all clients on the network are using the new encryption key so that it can stop frequently broadcasting advertise packets.

The transition to a new encryption key may be lengthy. Thus, in one embodiment, re-keying should be done infrequently. Re-keying should not be initiated if the authenticated client is currently authenticating to another client, or clients are authenticating to the authenticated client. This prevents strange states, and should reduce the likelihood of two clients initiating re-keying simultaneously.

Multiple Client Support

Each client should be able to allow multiple clients to be authenticating to it simultaneously. This support should be available even while it is attempting to authenticate with another client. However, a client should never begin authenticating to a client that is already attempting to authenticate with the client. If a client authenticates with another client, thus changing its encryption type or getting a new encryption key, the client should send an Ad Hoc cancel packet to other clients currently authenticating with it. All clients, whether authenticating other clients or being authenticated by other clients, should be able to handle receiving an Ad Hoc cancel packet at any point in the authentication process and cancel the authentication session upon receiving the Ad Hoc cancel packet. No response is necessary when receiving an Ad Hoc cancel packet. An authenticating client that receives an Ad Hoc cancel packet can then send out a start packet to determine what it should do next.

When a client is handling the maximum number of simultaneous authentication sessions, it should not reply to start packets. This will prevent other clients from trying to authenticate with it until the client is able participate in other authentication sessions.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within the computer 520, such as during start-up, may be stored in ROM 524.

The computer system 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 552, magnetic disk drive-interface 533, and optical drive interface 534, respectively. The drives and their associated computer-readable media provide nonvolatile storage of computer-executable instructions, data structures, program modules, and other data for computer system 520. Although the example environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer system 520 through keyboard 540, pointing device 542, or other input devices (not shown), such as, for example, a microphone, joy stick, game pad, scanner, or the like. These and other input devices can be connected to the processing unit 521 through serial port interface 546 coupled to system bus 523. Alternatively, input devices can be connected by other interfaces, such as, for example, a parallel port, a game port, a universal serial bus ("USB") port, or a Fire Wire port. A monitor 547 or other display device is also connected to system bus 523 via video adapter 548. Computer system 520 can also be connected to other peripheral output devices (not shown), such as, for example, speakers and printers.

Computer system 520 is connectable to networks, such as, for example, an office-wide or enterprise-wide computer network, an intranet, and/or the Internet. Computer system 520 can exchange data with external sources, such as, for example, remote computer systems, remote applications, and/or remote databases over such a network.

Computer system 520 includes network interface 553, through which computer system 520 receives data from external sources and/or transmits data to external sources. As depicted in FIG. 5, network interface 553 facilitates the exchange of data with remote computer system 583 via link 551. Link 551 represents a portion of a network, and remote computer system 583 represents a node of the network. For example, remote computer system 583 may maintain a database that provides content for Web responses constructed at computer system 520. On the other hand, computer system 583 may be a server computer that requested content from a database maintained at computer system 520.

Likewise, computer system 520 includes serial port interface 546, through which computer system 520 receives data from external sources and/or transmits data to external sources. Serial port interface 546 is coupled to modem 554, through which computer system 520 receives data from and/or transmits data to external sources. Alternately, modem 554 can be a Data Over Cable Service Interface Specification ("DOCSIS") modem or digital subscriber lines ("DSL") modem that is connected to computer system 520 through an appropriate interface. However, as depicted in FIG. 5, serial port interface 546 and modem 554 facilitate the exchange of data with remote computer system 593 via link 552. Link 552 represents a portion of a network, and remote computer system 593 represents a node of the network. For example, remote computer system 593 may a client computer system that requests Web responses from computer system 520. On the other hand, computer system 593 may a server computer system that provides Web responses to computer system 520.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

Modules of the present invention, as well as associated data, can be stored and accessed from any of the computer-readable media associated with computer system 520. For example, portions of such modules and portions of associated program data may be included in operating system 535, application programs 536, program modules 537 and/or program data 538, for storage in system memory 522. When a mass storage device, such as, for example, magnetic hard disk 539, is coupled to computer system 520, such modules and associated program data may also be stored in the mass storage device. In a networked environment, program modules and associated data depicted relative to computer system 520, or portions thereof, can be stored in remote memory storage devices, such as, for example, system memory and/or mass storage devices associated with remote computer system 583 and/or remote computer system 593. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of configuring an unauthenticated client in a network for secure communications the method comprising:
   periodically broadcasting, from an access point, a start packet;
   waiting for advertise packets from advertising clients;
   prioritizing, based on at least one encryption algorithm supported by the unauthenticated client, any advertise packets that are received at the access point;
   attempting to authenticate with an advertising client corresponding to the highest priority advertise packet that is received if any; and
   if attempting to authenticate results in the unauthenticated client becoming an authenticated client, configuring the authenticated client for secure communications using information from the advertise packet and information obtained from attempting to authenticate.

2. The method of claim 1 further comprising checking to see if any advertise packets have been received and if no advertise packets have been received continuing to periodically broadcast a start packet and wait for advertise packets from advertising clients.

3. The method of claim 1 further comprising checking to see if advertise packets have been received from advertising clients with security supported by the unauthenticated client and if no advertise packets have been received form advertising clients with security supported by the unauthenticated client, continuing to periodically broadcast a start packet and wait for advertise packets from advertising clients.

4. The method of claim 1 wherein advertise packets comprise:
   an identity request;
   encryption types supported by the advertising client sending the advertise packet;
   optionally, an encryption type used by the advertising client sending the advertise packet;
   optionally, a timer value for an encryption key currently being used by the advertising client sending the advertise packet indicating how long the encryption key has been in use; and
   optionally, a signature derived from the encryption key.

5. The method of claim 4 further comprising determining that an advertise packet has been received by an authenticated client if the advertise packet comprises at least one of: encryption types used by the advertising client sending the advertise packet, a timer value for an encryption key currently being used by the advertising client sending the advertise packet indicating how long the encryption key has been in use, and a signature derived from the encryption key.

6. The method of claim 1 wherein attempting to authenticate with a client corresponding to the highest priority advertise packet comprises:
getting an authentication type from the unauthenticated client;
sending an identity response packet including an identity of the unauthenticated client and the authentication type to the advertising client corresponding to the highest priority advertise packet; and
sending and receiving other packets for authentication.

7. The method of claim 6 wherein the authentication type comprises at least one of a password and optionally a username, a digital certificate, a digital certificate stored on a smart card, public keys, one-time passwords, and biometric authentication types.

8. The method of claim 6 wherein the identity response packet is a select encryption packet that comprises a unique code.

9. The method of claim 6 wherein if attempting to authenticate does not result in the unauthenticated client becoming authenticated the method further comprising:
adding the advertising client to which authentication was attempted to an ignore list, the ignore list comprising an enumeration of advertising clients whose advertising packets are disregarded by the unauthenticated client;
prompting a user at the unauthenticated client for a new authentication type;
if a new authentication type is entered, clearing the ignore list and attempting to authenticate with the authenticated client corresponding to the highest priority advertise packet again with the new authentication type; and
if a new authentication type is not entered, continuing to periodically broadcast a start packet and wait for advertise packets from advertising clients.

10. The method of claim 9 wherein prompting the user at the unauthenticated client for a new authentication type is performed after the unauthenticated client has unsuccessfully attempted to authenticate with other advertising clients.

11. The method of claim 1 wherein configuring the unauthenticated client for security comprises:
resetting a timer value wherein the timer values specifies the length of time a particular encryption key has been in use;
changing the encryption key used by the unauthenticated client;
communicating to a LAN device at the unauthenticated client to start using the encryption key; and
broadcasting an advertise packet.

12. The method of claim 1 wherein the period for periodically broadcasting a start packet is correlated to an awake period in a power saving mode.

13. The method of claim 1 wherein prioritizing any advertise packets that are received comprises ranking advertising clients using the following criteria, the following criteria organized according to highest priority:
(a) advertising clients that are using encryption with an encryption algorithm supported by the unauthenticated client, wherein the advertising clients are currently authenticated;
(i) the advertising clients using encryption with an encryption algorithm supported by the unauthenticated client are further prioritized by the encryption type the advertising client is using where clients with smaller encryption types are prioritized higher than clients with larger encryption types;
(ii) the advertising clients using encryption with an encryption algorithm supported by the unauthenticated client are further prioritized by timer values wherein a timer value indicating that an encryption key has been used for a lesser period of time is prioritized higher than an encryption key that has a timer value that indicates that the encryption key has been used for a greater period of time;
(b) advertising clients that are not using encryption and support one or more encryption algorithms supported by the unauthenticated client where the advertising clients are not currently authenticated;
(i) the advertising clients that are not using encryption are further prioritized by the encryption types they have in common with the unauthenticated client where advertising clients with larger encryption types are prioritized higher than clients with smaller encryption types;
(c) advertising clients that are using encryption and are using an encryption algorithm not supported by the unauthenticated client but that also support one or more encryption algorithms supported by the unauthenticated client;
(i) the advertising clients using an encryption algorithm not supported by the unauthenticated client but that also support one or more encryption algorithms supported by the unauthenticated client further being prioritized by the encryption types that they have in common with the unauthenticated client where advertising clients with larger encryption types are prioritized higher than advertising clients with smaller encryption types
(ii) the advertising clients using an encryption algorithm not supported by the unauthenticated client but that also support one or more encryption algorithms supported by the unauthenticated client further being prioritized by timer values wherein a timer value indicating that an encryption key has been used for a lesser period of time is prioritized higher than an encryption key that has a time value that indicates that the encryption key has been used for greater period of time;
(d) advertising clients that do not support any of the encryption algorithms supported by the unauthenticated client wherein the unauthenticated client does not authenticate with the advertising clients that do not support any of the encryption algorithms supported by the unauthenticated client.

14. The method of claim 1 further comprising:
receiving a start packet from another unauthenticated client;
switching the unauthenticated client to an authenticated mode; and
allowing the other unauthenticated client to attempt to authenticate with the unauthenticated client in authenticated mode.

15. The method of claim 14 wherein if the attempt to authenticate results in the other unauthenticated client becoming an other authenticated client, the method further comprising:
creating a random encryption key, random encryption key index, and encryption signature;

communicating to a LAN device at the unauthenticated client in authenticated mode to start using the encryption key;

sending the other authenticated client the random encryption key and a Unicast key;

resetting a timer value wherein the timer values specifies the length of time a particular encryption key has been in use; and broadcasting an advertise packet.

16. The method of claim 14 wherein if the attempt to authenticate is not successful, the method further comprising reverting back to an unauthenticated state.

17. A computer readable medium with computer executable instructions for performing the method of claim 1.

* * * * *

UNITED STATES PATENT AND TRADEMARK OFFICE
CERTIFICATE OF CORRECTION

PATENT NO. : 7,660,990 B1 Page 1 of 1
APPLICATION NO. : 10/832698
DATED : February 9, 2010
INVENTOR(S) : Thomsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Thirtieth Day of November, 2010

David J. Kappos
*Director of the United States Patent and Trademark Office*